United States Patent
Fukano et al.

(10) Patent No.: US 8,622,365 B2
(45) Date of Patent: Jan. 7, 2014

(54) PINCH VALVE

(75) Inventors: Yoshihiro Fukano, Moriya (JP); Shoichi Makado, Moriya (JP); Yasuhiro Ushijima, Joso (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/472,806

(22) Filed: May 16, 2012

(65) Prior Publication Data

US 2013/0119284 A1    May 16, 2013

(30) Foreign Application Priority Data

Nov. 10, 2011    (JP) ................................. 2011-246411

(51) Int. Cl.
*F16K 7/04*    (2006.01)
*F16K 31/02*    (2006.01)

(52) U.S. Cl.
USPC ....................... 251/7; 251/129.02; 251/129.15

(58) Field of Classification Search
USPC ............. 251/4, 7, 129.15, 129.02; 604/64, 34
See application file for complete search history.

(56) References Cited

U.S. PATENT DOCUMENTS

| | | | |
|---|---|---|---|
| 4,259,985 A * | 4/1981 | Bergmann | 137/595 |
| 4,524,802 A * | 6/1985 | Lawrence et al. | 137/595 |
| 4,993,456 A * | 2/1991 | Sule | 137/595 |
| 5,188,334 A * | 2/1993 | Yoshii et al. | 251/7 |
| 5,203,534 A * | 4/1993 | Demarest et al. | 251/7 |
| 6,261,269 B1 * | 7/2001 | Lecuyer | 604/250 |
| 6,386,505 B2 * | 5/2002 | Schob | 251/7 |
| 6,886,597 B2 * | 5/2005 | Dragoni et al. | 137/625.33 |
| 7,104,275 B2 * | 9/2006 | Dille | 137/487.5 |
| 2001/0002237 A1 * | 5/2001 | Ota et al. | 417/222.2 |
| 2002/0094278 A1 * | 7/2002 | Fukanuma et al. | 417/222.2 |
| 2003/0010946 A1 | 1/2003 | Furukawa et al. | |
| 2010/0252763 A1 * | 10/2010 | Courth et al. | 251/129.15 |

FOREIGN PATENT DOCUMENTS

| | | |
|---|---|---|
| JP | 48-095215 | 11/1973 |
| JP | 48-095216 | 11/1973 |
| JP | 49-011318 | 1/1974 |
| JP | 58-125770 | 8/1983 |
| JP | 2002-174352 | 6/2002 |

OTHER PUBLICATIONS

Notice of Allowance dated Jun. 25, 2013 issued in Japanese Patent Application No. 2011-246411 w/English Translation.

* cited by examiner

*Primary Examiner* — Stephen M Hepperle
*Assistant Examiner* — Jonathan Waddy
(74) *Attorney, Agent, or Firm* — Oblon, Spivak, McClelland, Maier & Neustadt, L.L.P.

(57) ABSTRACT

A pinch valve includes a spring disposed between a movable iron core of a solenoid and an end cover thereof, and which urges the movable iron core toward the side of a tube provided in a body. An elastic force of the spring is set to be smaller than a reactive force of the tube that is applied to a valve plug. In a non-excited state of the solenoid, the valve plug is pressed toward the solenoid by the reactive force of the tube, so as to enable a fluid to flow through a flow passage of the tube. Conversely, in an excited state of the solenoid, since an attractive force of the movable iron core toward the tube is added to the elastic force of the spring, the valve plug is pressed in opposition to the reactive force of the tube for thereby blocking the flow passage.

8 Claims, 4 Drawing Sheets

PINCH VALVE

CROSS-REFERENCE TO RELATED APPLICATION

This application is based upon and claims the benefit of priority from Japanese Patent Application No. 2011-246411 filed on Nov. 10, 2011, of which the contents are incorporated herein by reference.

BACKGROUND OF THE INVENTION

1. Field of the Invention

The present invention relates to a pinch valve, which is capable of switching the flow state of a fluid that flows through a passage.

2. Description of the Related Art

Heretofore, a pinch valve has been used for switching the flow state of a fluid that flows inside a conduit made up of a tube or the like. As disclosed, for example, in Japanese Laid-Open Patent Publication No. 2002-174352, such a pinch valve is equipped with a body, a conduit provided in the body through which a fluid flows, a clamping piece for deforming the conduit by clamping the same and thereby switching the flow state of the fluid, and a piston for urging the clamping piece in directions to approach and separate away from the conduit. In addition, for example, by pressing and moving the piston toward the conduit under a supply action of a pressure fluid, the piston is moved together with the clamping piece, whereby the conduit is clamped and crushed between the body and the clamping piece, and as a result, flow of the fluid through the interior of the conduit is blocked.

SUMMARY OF THE INVENTION

However, with the aforementioned pinch valve, there is a demand for further miniaturization thereof, as well as for enabling switching of the flow state of the fluid to be accomplished more rapidly.

A general object of the present invention is to provide a pinch valve which can be made lighter in weight and smaller in scale, while also being capable of more rapidly switching the flow state of a fluid.

The present invention is characterized by a pinch valve comprising a body, an elastic conduit supported in the body and through which a fluid flows, a solenoid connected to the body and having a coil, the solenoid being excited by energizing the coil for attracting a movable iron core toward a fixed iron core, a valve mechanism having a valve plug disposed to face toward the conduit and which is displaceable along an axial direction of the body, wherein the valve mechanism presses the valve plug toward the conduit by excitation of the solenoid, and an elastic means that urges the movable iron core toward the fixed iron core. By displacement of the valve plug toward the conduit, the conduit is clamped between the valve plug and the body, to thereby interrupt flow of the fluid.

According to the present invention, in the solenoid, the coil is energized by supplying electrical power thereto, so that the movable iron core is attracted to the side of the fixed iron core, and the elastic means is disposed in the solenoid, which biases the movable iron core toward the fixed iron core. In addition, when the movable iron core is attracted to the side of the fixed iron core upon excitation of the solenoid, and the valve plug is displaced toward the conduit through the movable iron core for pressing the conduit, in the movable iron core, because the elastic force of the elastic means is added together with the attractive force of the solenoid, a reactive force of the elastic conduit is overcome, so that the conduit can be deformed and flow of the fluid can be interrupted.

Consequently, with a simple structure including the elastic means, because a large pressing force can be secured for pressing the conduit by the valve plug, for example, compared to a case of a pressing force of the same degree but without providing a spring therein, the solenoid can be made lightweight and smaller in size. Further, when the valve plug is operated through the movable iron core, by adding thereto the elastic force of the elastic means, the valve plug can be moved more rapidly toward the conduit.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
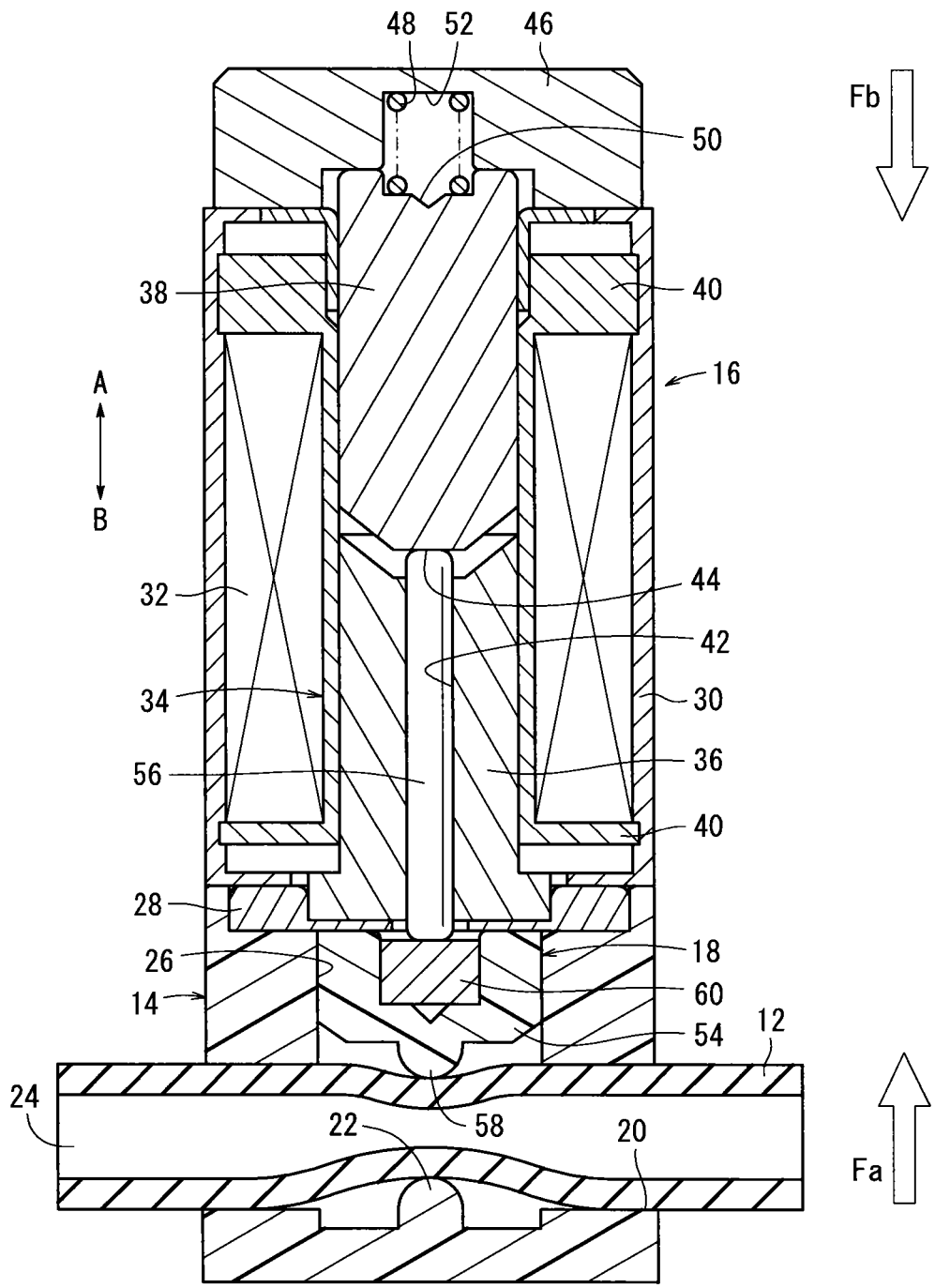
FIG. 1 is an overall cross sectional view of a pinch valve according to a first embodiment of the present invention.

In FIG. 1, reference numeral 10 indicates a pinch valve according to a first embodiment of the present invention.

Figure 2:
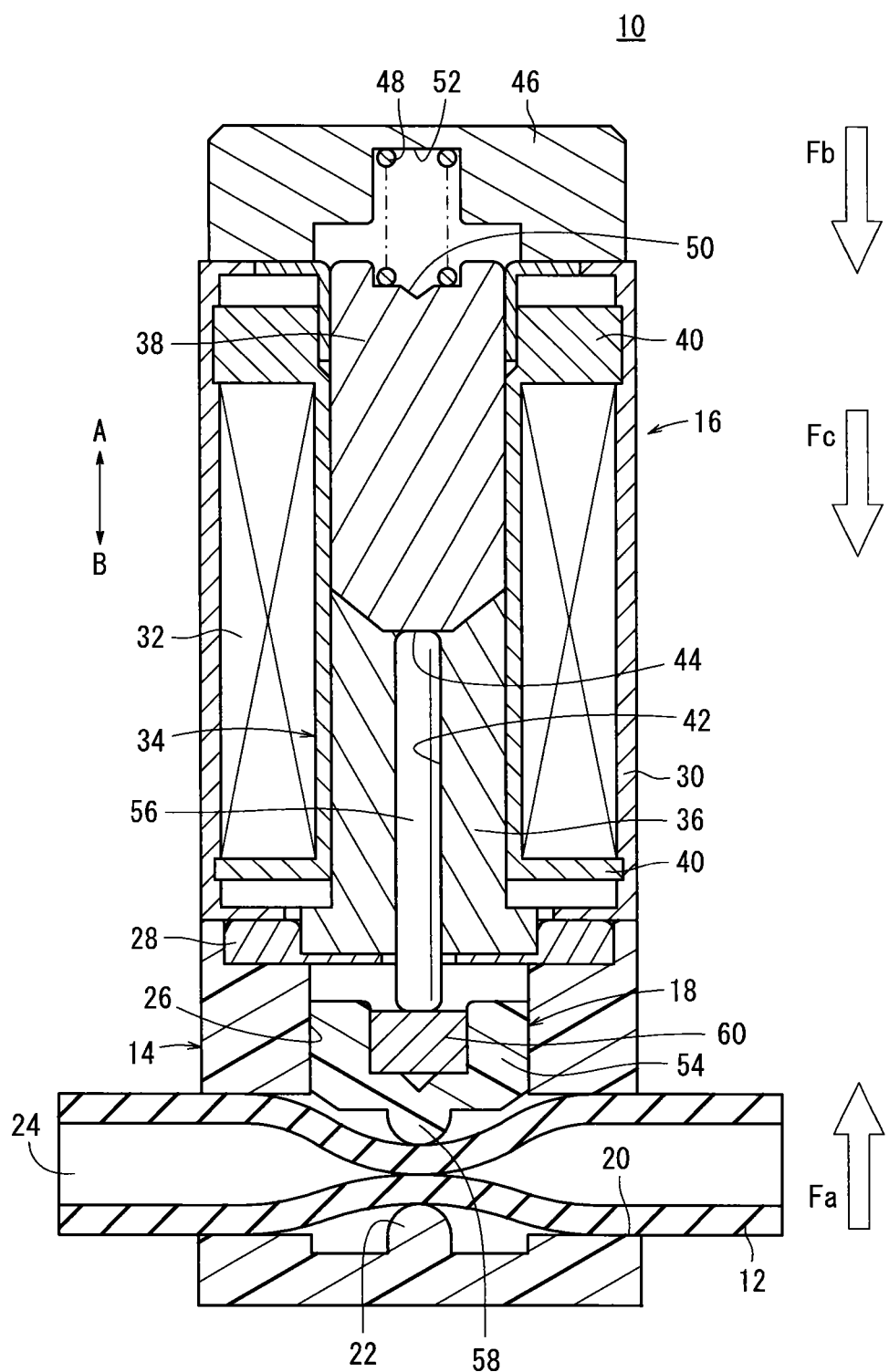
FIG. 2 is an overall cross sectional view showing a state in which a valve plug is displaced for clamping a tube and blocking a fluid passage in the pinch valve of FIG. 1.

As shown in FIGS. 1 and 2, the pinch valve 10 includes a body 14 having a tube (conduit) 12 inserted therein through which a fluid, for example, water or blood, flows, a solenoid 16 connected to an upper part of the body 14, and a valve mechanism 18 provided in the interior of the solenoid 16 and the body 14, which is displaceable along an axial direction (the direction of arrows A and B) upon excitation of the solenoid 16.

The body 14 is formed, for example, from a resin material having a through hole 20 that penetrates linearly therethrough, with a clamping member 22 that projects upwardly (in the direction of the arrow A) being formed substantially in the center thereof. The clamping member 22 is arranged perpendicularly with respect to the direction of extension of the through hole 20, and is formed to project at a given height with respect to the inner circumferential surface of the through hole 20. An end of the clamping member 22 is formed in a hemispherical shape.

The tube 12 is formed in a tubular shape from a material having a certain elasticity such as rubber, a resin material, or the like, and is inserted into the through hole 20 of the body 14. In addition, the outer circumferential surface of the tube 12 is held in intimate contact with the inner circumferential surface of the through hole 20, whereby the tube 12 is supported in the body 14 and forms therein a flow passage 24 through which a fluid flows.

Further, substantially in the center of the body 14, a valve hole 26 is formed that communicates with the through hole 20. The valve hole 26 extends perpendicularly to the through hole 20 and opens in an upward direction (in the direction of the arrow A). A valve plug 54 of a later-described valve mechanism 18 is disposed for displacement in the valve hole 26, the valve hole 26 being sealed by a cover plate 28 in a condition with the valve plug 54 being disposed therein. The tube 12 extends perpendicularly in the body 14 with respect to the valve hole 26.

The solenoid 16 includes a cylindrical housing 30 connected to an upper part of the body 14, a bobbin 34 having a coil 32 wound thereon and disposed inside the housing 30, a fixed iron core 36 provided in the interior of the bobbin 34, and a movable iron core 38 disposed for displacement on the same axis with the fixed iron core 36.

The bobbin 34 comprises a pair of flanges 40 that project radially outward on both ends in the axial direction (the direction of arrows A and B) thereof, the flanges 40 engaging with the inner circumferential wall of the housing 30, with the coil 32 being wound on the bobbin 34 between one and the other of the respective flanges 40. The coil 32 is connected electrically with respect to a non-illustrated power source.

The fixed iron core 36 is made from a magnetic material, for example, magnetic stainless steel or the like, the lower end thereof being fixed with respect to the cover plate 28, and the upper end thereof being inserted and fixed inside the bobbin 34. A shaft hole 42 that penetrates in the axial direction (the direction of arrows A and B) is formed in the center of the fixed iron core 36. A shaft 56 of a later-described valve mechanism 18 is inserted and supported for displacement in the shaft hole 42.

The movable iron core 38, similar to the fixed iron core 36, is made from a magnetic material, for example, magnetic stainless steel or the like, and is disposed for displacement along the interior of the bobbin 34. One end of the movable iron core 38 is arranged to face toward the fixed iron core 36, and has a tapered surface, which is tapered toward the side of the fixed iron core 36 (in the direction of the arrow B). Further, an abutment surface 44, which is a planar surface perpendicular to the axis of the movable iron core 38, and which abuts against the shaft 56, is formed on the one end of the movable iron core 38. The other end of the movable iron core 38 is arranged to face toward an end cover (cover member) 46, which is connected to an upper part of the housing 30.

In addition, a spring (elastic means) 48, which urges the movable iron core 38 toward the side of the fixed iron core 36 (in the direction of the arrow B), is disposed between the movable iron core 38 and the end cover 46.

The spring 48, for example, is made up from a coil spring, which is interposed between a first recess 50 provided on an end surface (the other end) of the movable iron core 38 and a second recess 52 formed on an end surface of the end cover 46. The first and second recesses 50, 52 are arranged to confront one another mutually, and function together as a positioning means for positioning the spring 48, and for regulating movement of the spring 48 in both axial (the direction of arrows A and B) and perpendicular directions.

In addition, by electrically energizing the coil 32, which is connected to a non-illustrated power source, the coil 32 is excited, whereby the movable iron core 38 is attracted and moved a predetermined distance toward the side of the fixed iron core 36 (in the direction of the arrow B).

The valve mechanism 18 includes a valve plug 54 disposed in the valve hole 26 of the body 14, a shaft 56 that abuts against an upper end surface of the valve plug 54 and is supported for displacement with respect to the fixed iron core 36, and the clamping member 22 that is disposed in the body 14. The valve plug 54 is formed, for example, from a resin material with a rectangular shape in cross section, and comprises a projection 58 on a lower end surface thereof facing the tube 12, which projects toward the side of the tube 12 (in the direction of the arrow B). The projection 58 is arranged to confront the clamping member 22 while sandwiching (clamping) the tube 12 therebetween. The end of the projection 58 has a hemispherical shape, similar to that of the clamping member 22.

Further, a cavity is recessed therein substantially in the center on the upper part of the valve plug 54, with a pressure receiving member 60 being installed in the cavity. The pressure receiving member 60 is formed, for example, from a metal material and is accommodated in the cavity so as to be substantially flush with the upper surface of the valve plug 54. The end of the shaft 56 is always in abutment with the pressure receiving member 60, such that the pressure receiving member 60 receives a pressing force that is imposed thereon from the shaft 56.

The shaft 56 has a fixed diameter and extends along the axial direction (the direction of arrows A and B), and is inserted displaceably through the shaft hole 42 in the fixed iron core 36. One end of the shaft 56 abuts against the pressure receiving member 60 mounted in the valve plug 54, whereas the other end thereof abuts against the abutment surface 44 of the movable iron core 38. In addition, the shaft 56 is pressed by displacement of the movable iron core 38 toward the side of the body 14 (in the direction of the arrow B), and as a result of the valve plug 54 being pressed downward (in the direction of the arrow B) through the shaft 56, the valve plug 54 moves along the valve hole 26 toward the side of the tube 12 (in the direction of the arrow B), whereby the tube 12 is deformed so as to be crushed or flattened by the projection 58.

At this time, when the tube 12 is pressed and deformed by the valve plug 54, a reactive force (opposing force) Fa of the tube 12, which is applied to the valve plug 54 from the tube 12, is set to be greater than the elastic force Fb of the spring 48 that is applied with respect to the movable iron core 38 to bias the movable iron core 38 (Fa>Fb). Stated otherwise, the elastic force Fb of the spring 48 is set to be smaller than the reactive force Fa of the tube 12.

The reactive force Fa of the tube 12 is applied in a vertical upward direction (the direction of the arrow A) to bias the valve plug 54, which is disposed above the tube 12, whereas the elastic force Fb of the spring 48, as well as the attractive force Fc of the movable iron core 38, are applied coaxially with the reactive force Fa, and in a vertical downward direction (the direction of the arrow B) toward the side of the tube 12, i.e., in an opposite direction to the reactive force Fa.

Moreover, the elastic force Fb of the spring 48 is set to a size that is capable of assuring a flow passage cross-sectional area to enable the fluid to flow at a predetermined flow rate in the flow passage 24 of the tube 12 when the tube 12 is pressed by the valve plug 54, which is pressed by the elastic force Fb.

The pinch valve 10 according to the first embodiment of the present invention is basically constructed as described above. Next, operations and advantages of the pinch valve 10 will be described. In the following description, the non-excited state of the solenoid 16 shown in FIG. 1 shall be described as an initial condition, in which a thrust force is not applied by the solenoid 16 in a downward direction (the direction of the arrow B) to the movable iron core 38, the shaft 56, and the valve plug 54, and the interior of the tube 12 is kept in a state of communication, i.e., is open, so that fluid continues to flow through the tube 12.

First, in such an initial condition, by supplying electrical power from a non-illustrated power source with respect to the coil 32 of the solenoid 16, the coil 32 becomes excited, and upon excitation thereof, the movable iron core 38 is attracted (in the direction of the arrow B) to the side of the fixed iron core 36 (see FIG. 2). At this time, the movable iron core 38 moves under a condition in which the elastic force Fb of the spring 48 is added with respect to the attractive force Fc produced by the solenoid 16, whereby the movable iron core 38 moves toward the side of the fixed iron core 36 (in the direction of the arrow B).

In this manner, as shown in FIG. 2, simultaneously with the shaft 56 being pressed by the movable iron core 38 toward the side of the body 14 (in the direction of the arrow B), the valve plug 54 is pressed by the shaft 56 and moves toward the side of the tube 12 (in the direction of the arrow B). In addition, the projection 58 of the valve plug 54 presses the tube 12 toward the side of the clamping member 22 (in the direction of the arrow B), and as a result of the tube 12 being crushed or flattened between the projection 58 and the clamping member 22, the flow passage 24 of the tube 12 is blocked. Consequently, flow of the fluid through the flow passage 24 of the tube 12 is interrupted.

More specifically, the pressing force that is applied to bias the valve plug 54 is composed of the sum total of the attractive force Fc imposed on the movable iron core 38 together with the elastic force Fb of the spring 48, and because the combined forces exceed the reactive force Fa of the tube 12 (Fa<Fb+Fc), the valve plug 54 overcomes the reactive force Fa and is made capable of deforming the tube 12.

On the other hand, by stopping supply of power to the solenoid 16, the energized state of the coil 32 is released, and the attractive force Fc with respect to the movable iron core 38 toward the side of the fixed iron core 36 (in the direction of the arrow B) is canceled. Owing thereto, because the reactive force Fa of the tube 12 applied toward the side of the valve plug 54 (in the direction of the arrow A) becomes greater than the elastic force Fb of the spring 48 that biases the valve plug 54 (in the direction of the arrow B) toward the side of the tube 12 (Fa>Fb), the valve plug 54 is pressed and returned by the reactive force Fa of the tube 12 toward the side of the solenoid 16 (in the direction of the arrow A). Along therewith, the shaft 56 and the movable iron core 38 are displaced toward the side of the end cover 46 (in the direction of the arrow A) in opposition to the elastic force Fb of the spring 48.

As a result, the pressed condition of the tube 12 by the valve plug 54 and the clamping member 22 is released, and the initial condition shown in FIG. 1 is restored under the elasticity of the tube 12, to thereby restore the state of communication (initial condition) enabling flow of fluid through the flow passage 24.

In the foregoing manner, according to the first embodiment, the solenoid 16 is included in the pinch valve 10 for urging the valve plug 54, upon energization of the coil 32, toward the side of the tube 12 (in the direction of the arrow B), and the spring 48 also is provided for biasing the movable iron core 38 of the solenoid 16 toward the side of the valve plug 54 (in the direction of the arrow B). In addition, by adding the elastic force Fb of the spring 48 together with the attractive force Fc of the movable iron core 38, at first, the combined force thereof is set to be greater than the reactive force Fa of the tube 12 (Fa<Fb+Fc). By providing such a structure, when the valve plug 54 is displaced toward the side of the tube 12 (in the direction of the arrow B) to crush or flatten the tube 12 and block flow of the fluid, because the elastic force Fb of the spring 48 is applied to the valve plug 54 in addition to the attractive force Fc of the movable iron core 38, the flowing state of the fluid can be blocked more rapidly.

Stated otherwise, when the movable iron core 38 is attracted by the attractive force Fc to press the valve plug 54, the spring 48 functions to assist in pressing the valve plug 54 by applying the elastic force Fb in the same direction.

Further, with a simple structure constituted by the spring 48, since a large pressing force on the tube 12 by the valve plug 54 is assured, for example, compared to a case in which a pressing force of the same degree is attempted to be secured without providing the spring 48, the solenoid 16 can be made more lightweight and smaller in size.

Furthermore, by replacing the spring 48 with a different one having a different elastic force Fb responsive to the reactive force Fa of the tube 12, it is possible to accommodate different tubes 12 of various types and characteristics.

Figure 3:
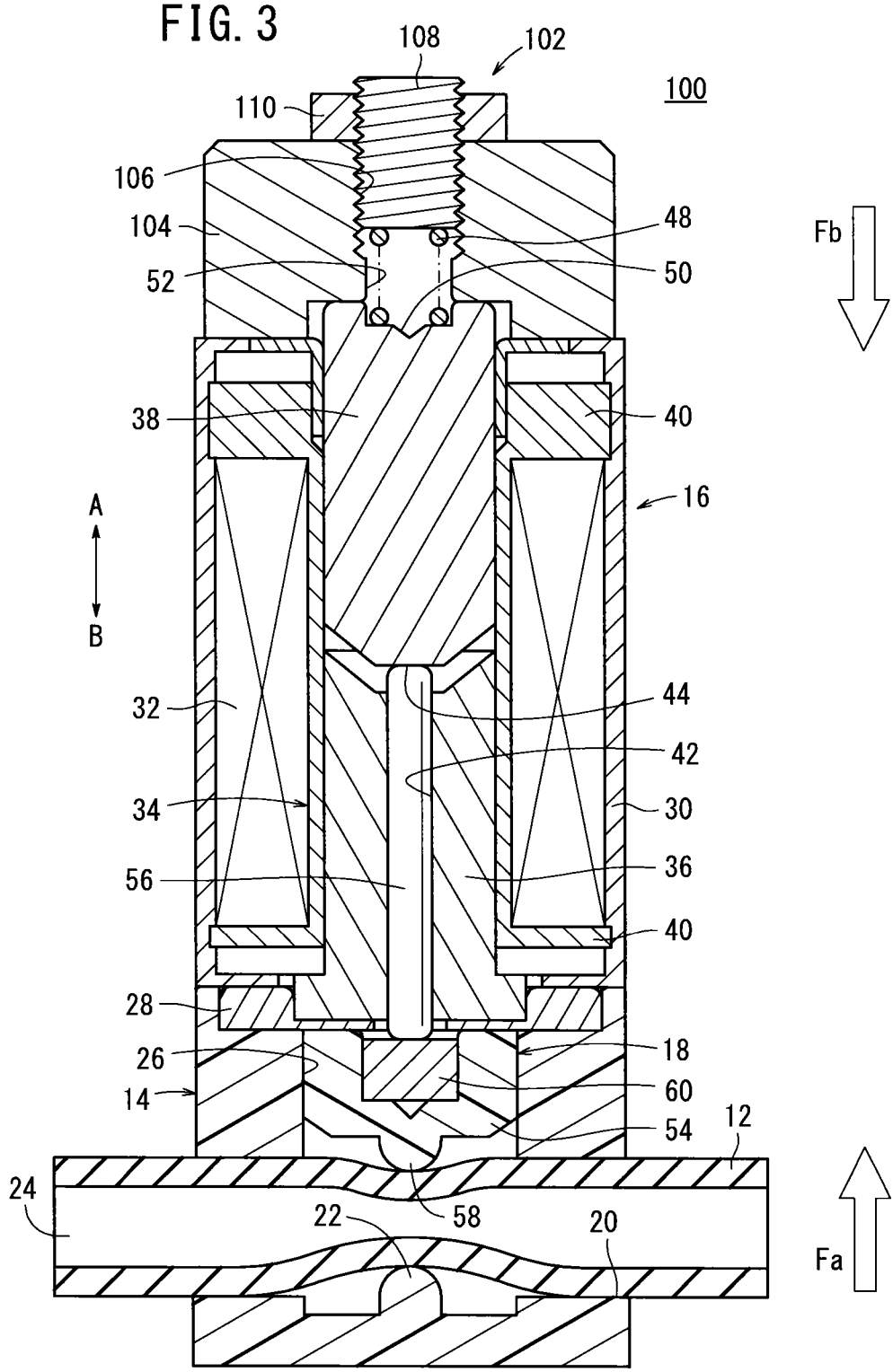
FIG. 3 is an overall cross sectional view of a pinch valve according to a second embodiment of the present invention.
Figure 4:
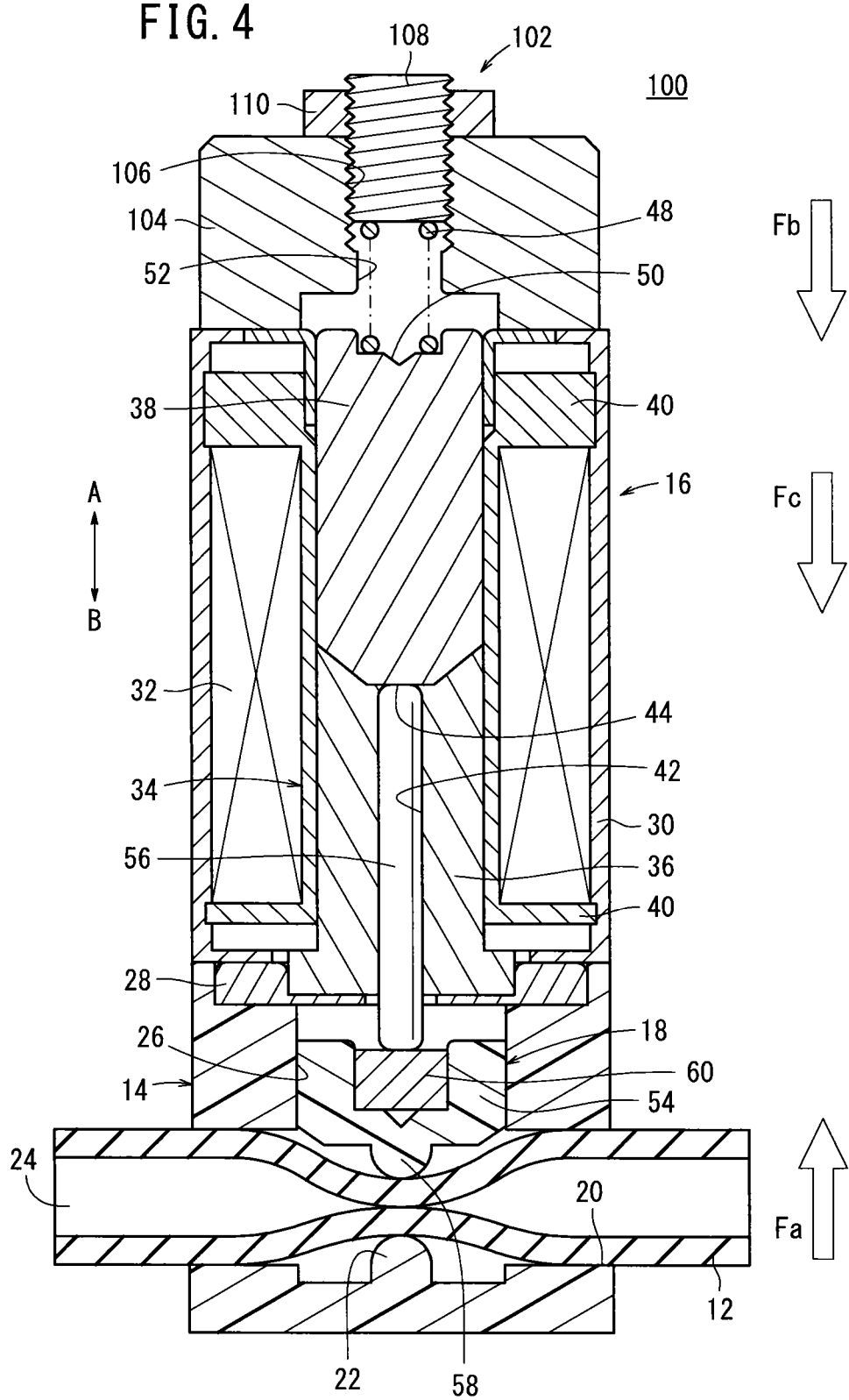
FIG. 4 is an overall cross sectional view showing a state in which a valve plug is displaced for clamping a tube and blocking a fluid passage in the pinch valve of FIG. 3.

Next, a pinch valve 100 according to a second embodiment is shown in FIGS. 3 and 4. Constituent elements thereof which are the same as those of the pinch valve 10 according to the first embodiment are denoted with the same reference characters, and detailed descriptions of such features are omitted.

The pinch valve 100 according to the second embodiment differs from the pinch valve 10 according to the first embodiment, in that an adjustment mechanism 102 is provided, which is capable of suitably adjusting the elastic force Fb of the spring 48 applied to the movable iron core 38.

As shown in FIGS. 3 and 4, a bolt hole 106, which communicates with the second recess 52, is formed substantially in the center of an end cover 104, and an adjustment bolt 108, which constitutes part of the adjustment mechanism 102, is threaded into the bolt hole 106.

The adjustment bolt 108, for example, comprises a stud bolt, the lower end part of which abuts against an end of the spring 48, and the upper end part of which projects upwardly with respect to the end cover 104. In addition, the adjustment bolt 108 is capable of advancing and retracting along the bolt hole 106 by screw-rotating the adjustment bolt 108. Further, a lock nut 110 is threaded onto an upper part of the adjustment bolt 108 in proximity to the end cover 104.

In addition, in a state in which the lock nut 110 is rotated and moved in a direction away from the end cover 104, the adjustment bolt 108 is screw-rotated with respect to the end cover 104. In this manner, the adjustment bolt 108 is advanced and retracted in the second recess 52 in directions to approach and separate with respect to the spring 48, whereby the elastic force Fb of the spring 48, which is pressed by the end of the adjustment bolt 108, is changed.

More specifically, by moving the adjustment bolt 108 toward the spring 48 (in the direction of the arrow B), since the spring 48 is compressed between the adjustment bolt 108 and the movable iron core 38, the pressing force that biases the movable iron core 38, the shaft 56, and the valve plug 54 toward the side of the tube 12 (in the direction of the arrow B) is increased. Conversely, by moving the adjustment bolt 108 in a direction away from the spring 48 (in the direction of the arrow A), since the compressed state with respect to the spring 48 is relaxed, the pressing force that biases the movable iron core 38, the shaft 56, and the valve plug 54 toward the side of the tube 12 (in the direction of the arrow B) is reduced.

In the foregoing manner, according to the second embodiment, for example, even in the case that the tube 12 is replaced by another tube formed from a material having a different elasticity, and the reactive force Fa of the tube 12 changes, since the elastic force imposed on the movable iron core 38 from the spring 48 can be adjusted by the adjustment mechanism 102 responsive to the reactive force Fa, an advantage exists in that it is unnecessary to exchange the spring 48 with another one having a different elastic force, each time that the tube 12 is replaced.

More specifically, in the case that the reactive force Fa of the tube 12 becomes greater as a result of replacing or exchanging the tube 12, by moving the adjustment bolt 108 toward the side of the tube 12 (in the direction of the arrow B), the spring 48 is compressed, and the elastic force Fb of the spring 48 increases. Conversely, in the event that the reactive force Fa of the tube 12 is decreased, by moving the adjustment bolt 108 in a direction away from the tube 12 (in the direction of the arrow A), compression of the spring 48 is relaxed, and the elastic force Fb of the spring 48 is reduced.

Further, adjustment of the elastic force Fb of the spring 48 by the adjustment mechanism 102 should be performed such that, in a non-excited state of the solenoid 16, the reactive force Fa of the tube 12 is greater than the elastic force Fb of the spring 48 (Fa>Fb), whereas in an excited state of the solenoid 16, the reactive force Fa of the tube 12 is smaller than the combined pressing force (Fb+Fc) of the sum total of the elastic force Fb of the spring 48 and the attractive force Fc of the movable iron core 38 (Fa<Fb+Fc).

The pinch valve according to the present invention is not limited to the embodiments described above, and it is a matter of course that various alternative or additional features and structures could be adopted therein without deviating from the essence and scope of the invention as set forth in the appended claims.

What is claimed is:

1. A pinch valve comprising:
   a body;
   an elastic conduit supported in the body and through which a fluid flows;
   a solenoid connected to the body and having a coil, the solenoid being excited by energizing the coil, for attracting a movable iron core toward a fixed iron core;
   a valve mechanism having a valve plug disposed to face toward the conduit and which is displaceable along an axial direction of the body, wherein the valve mechanism presses the valve plug toward the conduit by excitation of the solenoid, and wherein the conduit applies a reactive force against the valve plug pressed toward the conduit by the valve mechanism; and
   elastic means for providing a net force, other than said reactive force, acting on the movable iron core, that urges the movable iron core toward the fixed iron core,
   wherein said elastic means comprises all elements of the pinch valve applying an elastic force, other than the reactive force, to the movable iron core,
   wherein the movable iron core is urged by the net force of the elastic means toward the conduit when the solenoid is not excited, and the net force of the elastic means assists the excitation of the solenoid in pressing the valve plug toward the conduit, and
   wherein by displacement of the valve plug toward the conduit, the conduit is clamped between the valve plug and the body, to thereby interrupt the flow of the fluid.

2. The pinch valve according to claim 1, further comprising an adjustment mechanism capable of adjusting an elastic force of the elastic means.

3. The pinch valve according to claim 1, wherein the elastic means comprises a spring.

4. The pinch valve according to claim 2, wherein the elastic means comprises a spring.

5. The pinch valve according to claim 3, wherein the spring is interposed between a first recess provided on an end surface of the movable iron core, and a second recess of a cover member disposed to confront the end surface.

6. The pinch valve according to claim 1, wherein the valve mechanism comprises a shaft disposed between the movable iron core and the valve plug, and the valve plug is pressed and displaced toward the conduit by displacement of the shaft together with the movable iron core.

7. The pinch valve according to claim 1, wherein the net force of the elastic means is set to be smaller than the reactive force of the conduit.

8. The pinch valve according to claim 7, wherein the reactive force of the conduit is overcome by combining the net force of the elastic means with a thrust force imposed on the valve plug by the solenoid.

* * * * *